Nov. 21, 1933.  J. H. McCOLM  1,936,518
ROAD GRADER
Filed Jan. 2, 1932  7 Sheets-Sheet 5

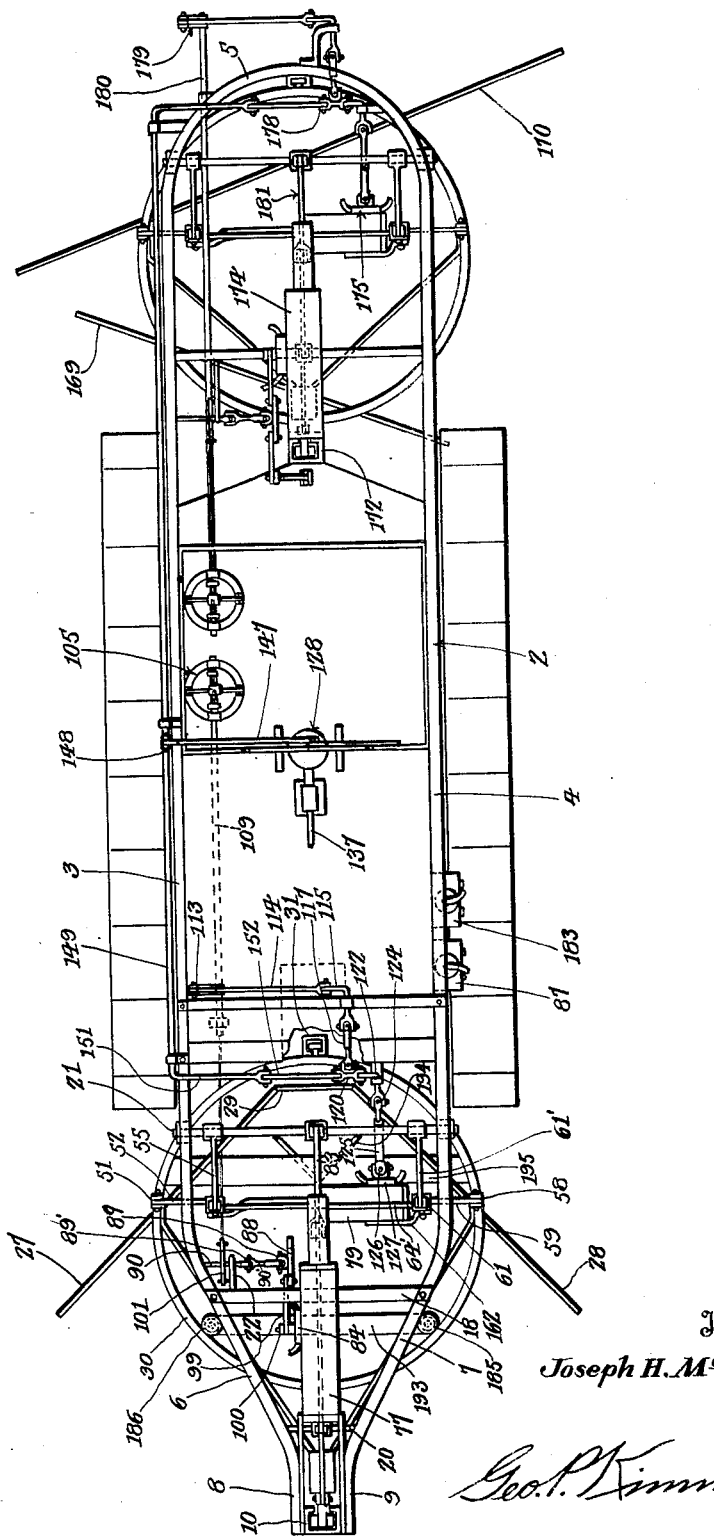

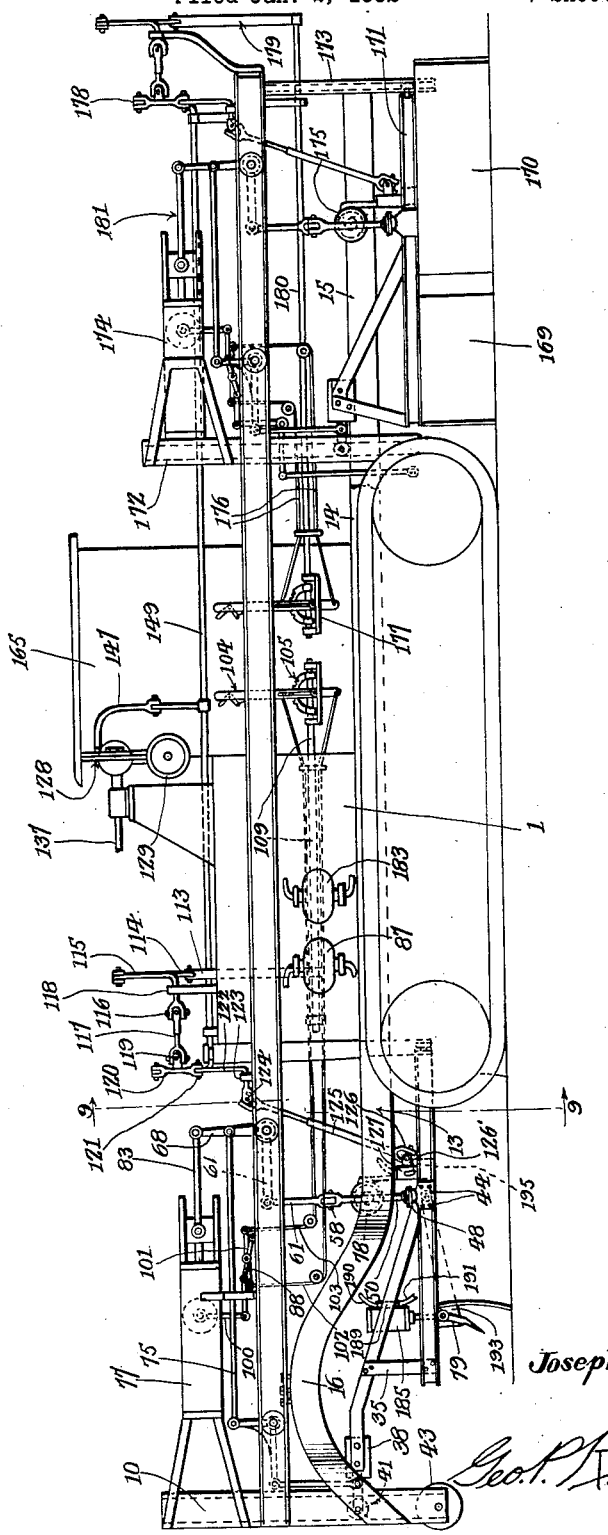

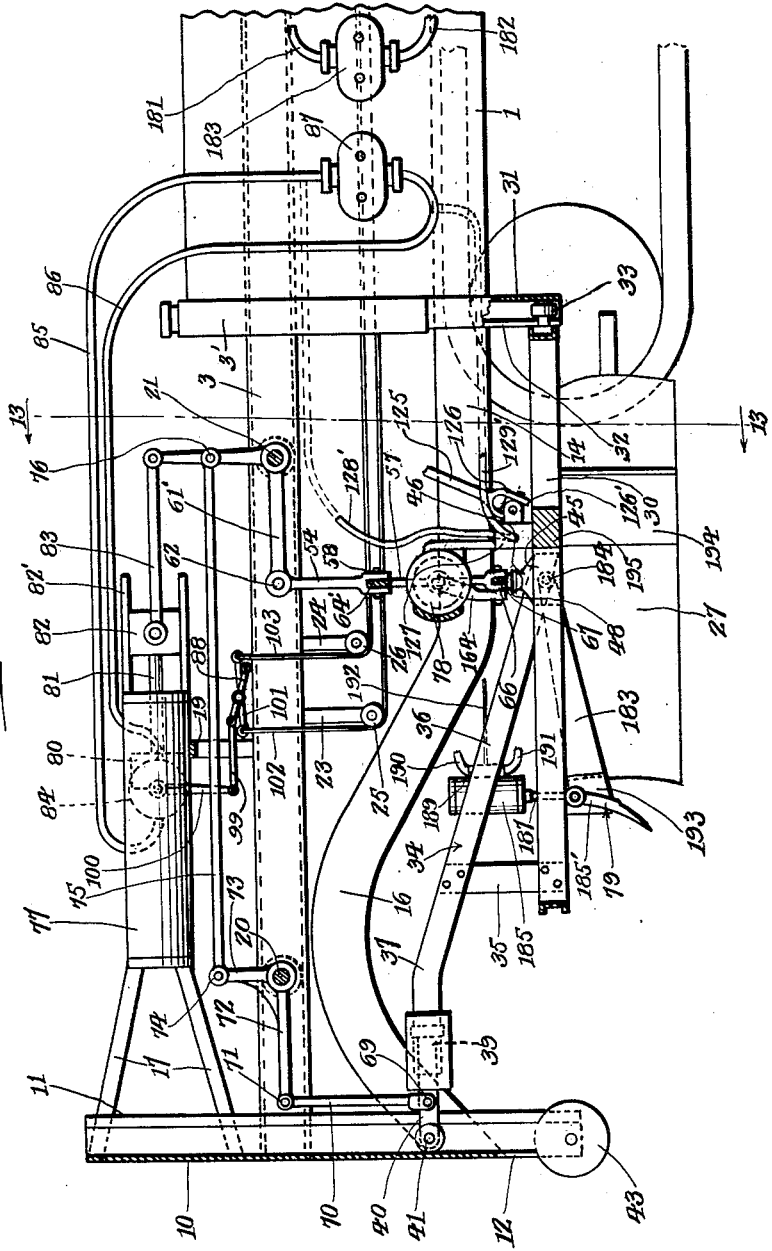

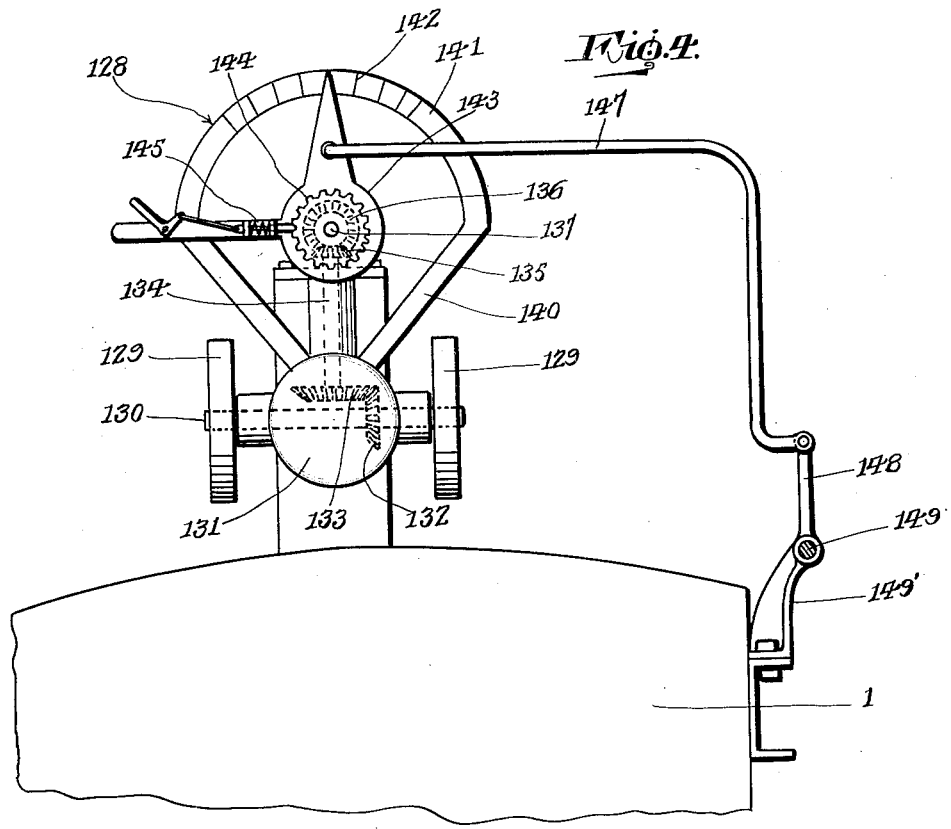
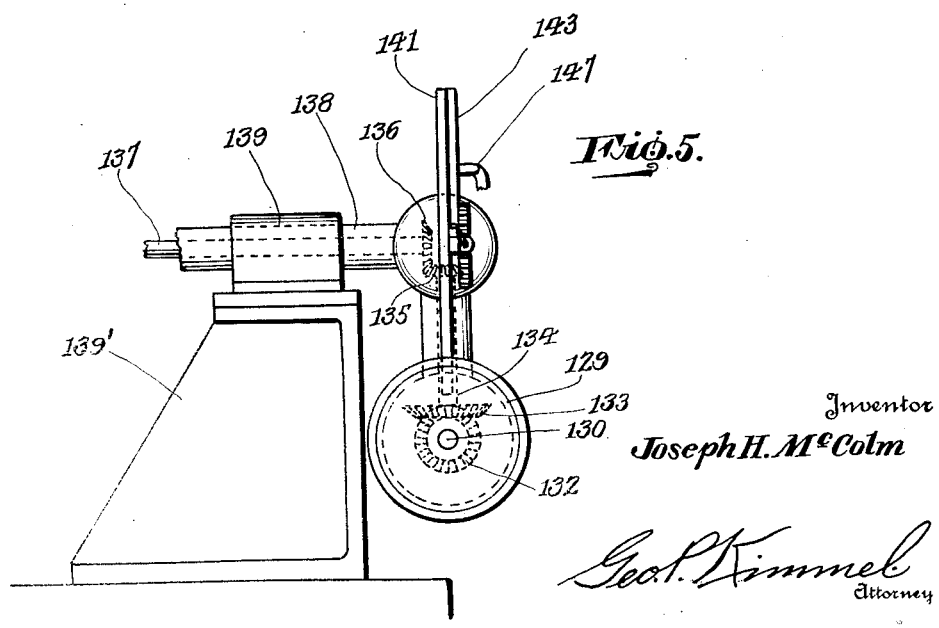

Inventor
Joseph H. McColm

By Geo. P. Kimmel
Attorney

Nov. 21, 1933.　　　　J. H. McCOLM　　　　1,936,518
ROAD GRADER
Filed Jan. 2, 1932　　　　7 Sheets-Sheet 6
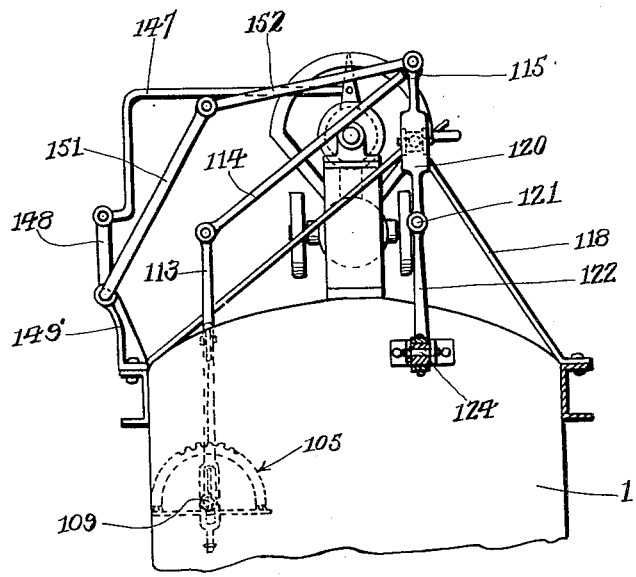
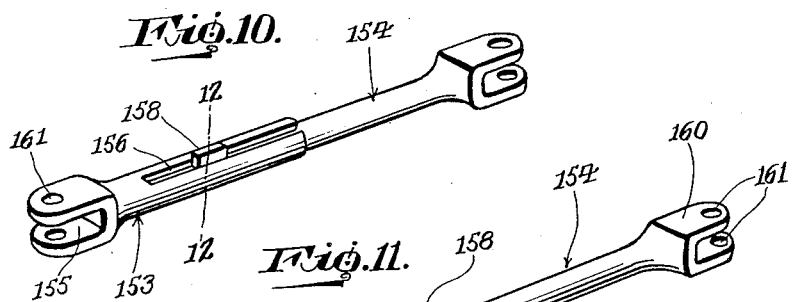
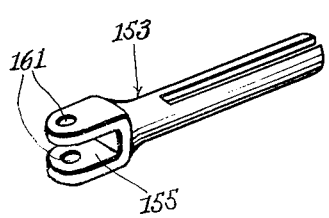
Inventor
Joseph H. McColm
By Geo. P. Kimmel
Attorney

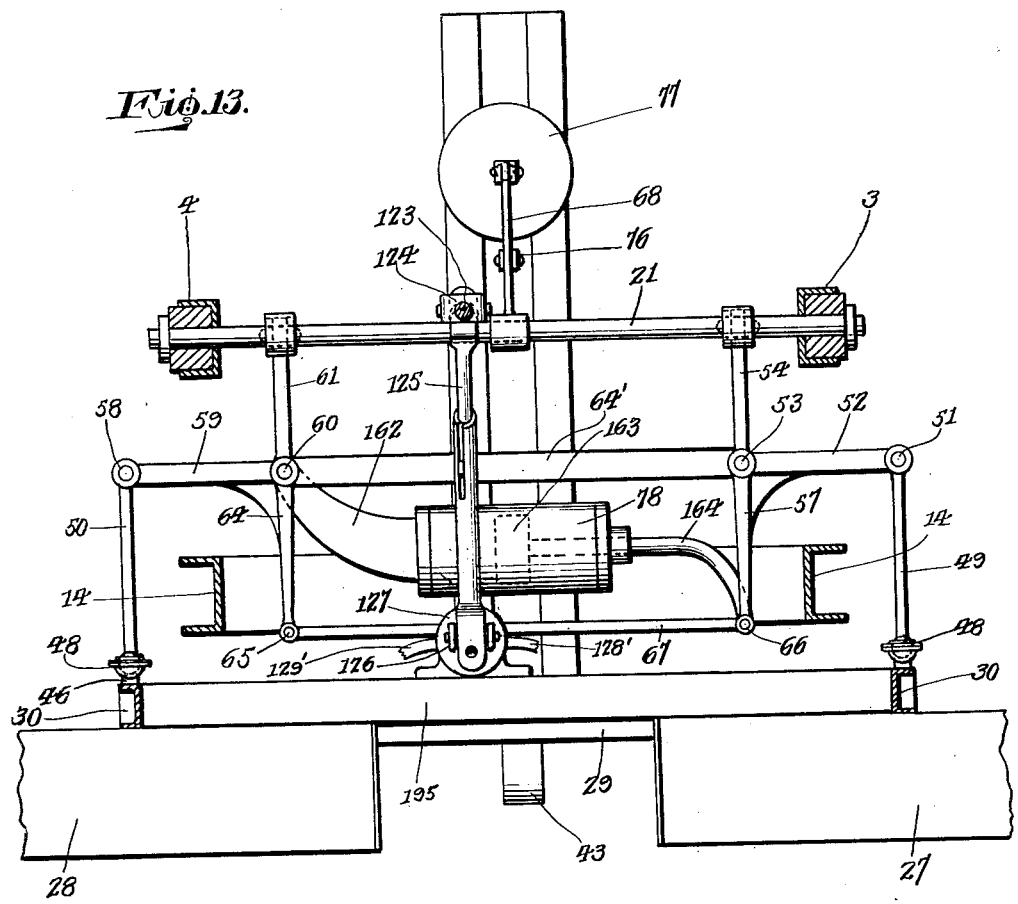

Patented Nov. 21, 1933

1,936,518

UNITED STATES PATENT OFFICE 1,936,518

ROAD GRADER

Joseph H. McColm, Gaston, Ind.

Application January 2, 1932. Serial No. 584,536

32 Claims. (Cl. 37—143)

My invention relates to a road grader.

The essential objects of my invention are to provide a machine of such class for insuring the automatic maintaining of the grade desired during the travel of the machine when performing its function; producing plane like surfaces under all conditions; holding the correct angle and depth of the grading and smoothing blades irrespective of the position of the propelling or carrying means of the machine during the travel of the latter; automatically changing the pulling points of the blades, as the blades change their positions with respect to carrier resulting in that all points of the blades will travel at the same rate of speed; changing the depth or angle individually of the grading or smoothing blades, or the depth and angle thereof simultaneously; holding the angular controlling means for the blades in set position during the raising or lowering of the blades; performing accurate work; providing for maintaining the blades at their proper position when they come in contact with surfaces of uneven hardness; providing for automatically increasing and decreasing of pressure applied to the blades, when they come in contact with surfaces of uneven hardness to maintain the blades in their proper position; providing for a smooth surface forwardly of the propelling means of the machine during the travel of the latter resulting in such means travelling smoothly or chatterless and which tends to assist the blades to run chatterless; firmly supporting the grading blades from a suspension structure extended forwardly from the propelling or carrying means of the machine; firmly supporting the smoothing blades from the suspension structure extended rearwardly from the propelling or carrying means of the machine; dispensing with supporting wheels forwardly of the grading blades and propelling or carrying means of the machine, and rearwardly of the smoothing blades and propelling means of the machine; automatically and manually adjusting the angle of the grading and smoothing blades; and to attain these ends in a strong, durable, compact, thoroughly efficient, conveniently handled, and comparatively inexpensive structure.

To the above ends essentially my invention consists of such parts and such combination of parts as fall within the scope of the invention as claimed.

In the drawings wherein like reference characters denote corresponding parts throughout the several views:

Figure 1 is a top plan view of a road grader in accordance with my invention.

Figure 2 is a side elevation thereof.

Figure 3 is a fragmentary view in side elevation and partly in section upon an enlarged scale of the front end of the machine.

Figure 4 is a detailed elevation of the gyroscope device and the operative connection therebetween and the shifting means for the angular controlling mechanism for the blades.

Figure 5 is a side elevation of the structure shown in Figure 4.

Figure 9 is a section on line 9—9 Figure 2.

Figure 10 is a detailed view in perspective of the sliding link element.

Figure 11 is a detailed view in perspective of the sliding link element disassembled.

Figure 12 is a section on line 12—12 Figure 10.

Figure 13 is a section on line 13—13 Figure 3, with certain elements omitted for clearness.

Figure 6:
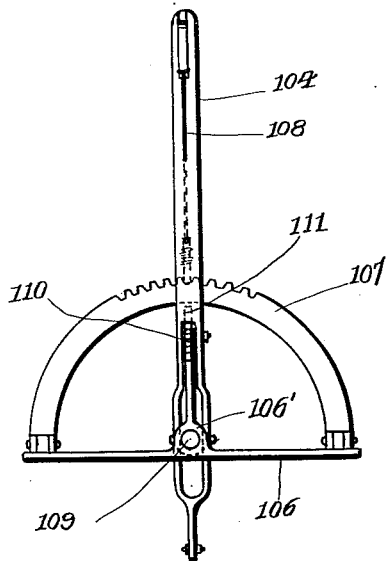
Figure 6 is a detailed view end elevation of the form of control lever.
Figure 7:
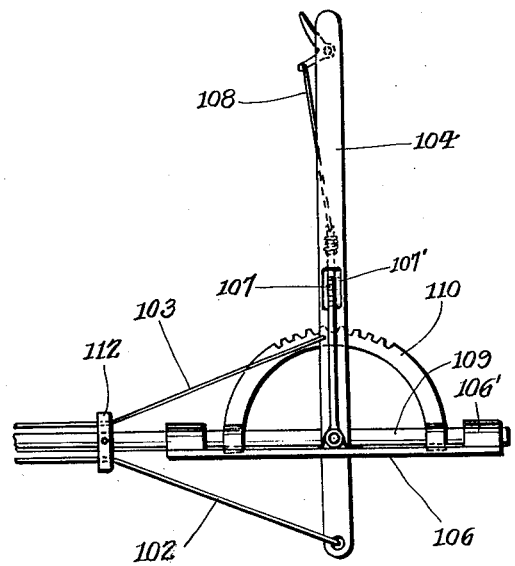
Figure 7 is a side elevation of such lever.
Figure 8:
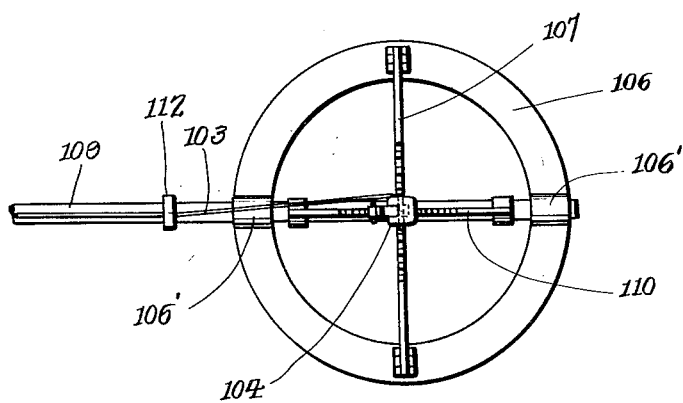
Figure 8 is a top plan view thereof.

The grader includes a propelling means which can be as desired and is illustrated by way of example as a tractor 1 of the crawling type.

A supporting element 2 is fixed to the sides of the tractor body and extends forwardly and rearwardly with respect to the ends of the latter. The element 2 includes a pair of side portions 3, 4, a curved rear portion 5, a pair of oppositely inclined inwardly extending portions 6, 7 and a pair of straight forward end portions 8, 9 arranged in parallel spaced relation. The portions 6, 7 extend from the forward ends of the side portions 3, 4 respectively and merge into the end portions 8, 9 respectively. The element 2 is channel shaped in vertical section.

Secured to the portions 8, 9, arranged between and extending above and depending below the latter is a vertically disposed supporting member 10 of channel shaped cross section and having its sides formed with inwardly extending opposed, spaced flanges 11. The lower portion of the front of member 10 is provided with a vertical slot 12 which opposes the space between flanges 11.

Secured to the bottom of the tractor body and arranged below the latter is a pair of anchoring members 13, each having an intermediate portion 14, an inwardly curved rear portion 15 and an inwardly inclined arcuate front portion 16. The portions 14 are arranged in parallel spaced relation. The portions 15 extend towards each other. The portions 16 extend towards each other, are secured to portions 6 and 7 respectively and are secured to opposite sides of member 110

10 below the transverse median of the latter. Extended rearwardly from each side of member 10 is a pair of inclined supporting arms 17.

Secured to the portions 6, 7 is a transverse supporting bar 18 having a depending U-part 19 centrally thereof. Secured to the portions 6, 7 is a transverse shaft 20 and to the portions 3, 4 is a transverse shaft 21. Extended rearwardly from bar 18 is a hanger 22. Depending from portion 3 is a pair of spaced hangers 23, 24 carrying on their lower ends pulleys 25, 26 respectively.

A pair of oppositely inclined grading blades are indicated at 27, 28. The blades inclined outwardly from rear to front. The rear ends of the blades are spaced from each other and the upper portions of the rear end edges of the blades are coupled together by a connecting bar 29. The blades stand on their lower lengthwise edges and attached to the upper lengthwise edges of the blades, intermediate the ends of the latter is a carrier 30 in the form of an annulus. The rear ends of the blades are positioned forwardly from the rear edge portion of the carrier 30. The forward portions of the blades project outwardly from opposite sides of the carrier 30 to eliminate side draft during heavy cutting. The blades are secured to the carrier at diametrically opposed points. Arranged between the blades 27 and 28 is a V-shaped blade 194 for cutting the surface left by blades 27 and 28. The blade 194 is secured to a cross bar 195 fixed to the carrier 30. Secured to the front of the body portion of the tractor and depending therefrom is a combined guide and retaining member 31 for the carrier 30. The member 31 is of channel shaped cross section and has the sides thereof formed with inwardly extending, opposed spaced flanges 32. Fixed to the rear of the annulus is a rolling headed coupling piece 33 which extends between the space formed by the flanges 32 and is rollably mounted in the member 31. Secured to the annulus 30 is a pair of oppositely disposed connecting bars 34 attached to vertical supports 35 secured to the annulus 30. Each connecting bar includes an upstanding inclined portion 36 which terminates into a horizontal portion 37 which is secured to the side of a block 38. The block 38 is swivelly connected, as at 39 to a link 40 which extends into the member 10 and carries a roller 41 riding against member 10. Carried by the lower end of member 10 is a roller 43.

Secured to the carrier 30 at diametrically opposed points, by the holdfast means 44 are upstanding bracket members 45, each having a tapered upper portion 46. Ball and socket joint connections 48 are arranged between members 45 and the lower ends of upstanding links 49, 50. Link 49 is pivotally connected as at 51 to the outer end of a link 52, and the latter has its inner end pivotally connected as at 53 to the lower end of a vertical link 54, the latter having its upper end pivoted to the outer end of a crank arm 55 carried by the shaft 21. The link 50 is pivotally connected as at 58 to an inwardly extending link 59, the latter being pivotally connected as at 60 to the lower end of an upstanding link 61, the latter having its upper end pivotally connected to a crank arm 61' carried by the shaft 21. Depending from the pivot connections 53, 60 are depending links 57, 64 respectively. Connected at its ends to the pivot connections 53, 60 is a bar 64'. The lower end of link 64 is pivotally connected as at 65, to one end of a bar 67, which is arranged in spaced relation with respect to the bar 64'. The other end of bar 67 is pivotally connected to the lower end of link 57, as at 66. The bars 64', 67 and links 64, 57 provide a parallelogram. Fixedly secured to the shaft 21, centrally thereof is an upstanding lever arm 68. The links 52 and 57 are integral with each other, that is one casting. The links 59 and 64 are integral with each other, that is one casting.

Pivotally connected at its lower end, as at 69 to the link 40 is an upstanding link 70, which is pivotally connected as at 71 to a rearwardly extending link 72, the latter being connected to shaft 20 and attached to the latter is an upstanding crank arm 73, which is pivotally connected as at 74 to a connecting bar 75, the latter having its other end pivotally connected to the lever arm 68, centrally of the latter as at 76. The links 72 and 73 are integral with each other, that is one casting.

The grader includes a depth control ram 77 for the grading blades and a ram 78 for controlling the angular disposition of such blades. The blades are positioned in an angular manner simultaneously. The depth of the blades is automatically controlled during the travel of the machine. The angular disposition of the blades is automatically maintained during the travel of the machine irrespective of the position of the tractor due to pitching or from travelling over an uneven traction surface. The automatic controls are independent of each other, that is to say the operation of each ram is independent. The depth of the blades, as well as the angular disposition of the latter can be set separately or simultaneously set manually. While depth or angle of blades is being changed manually, the automatic devices are still connected and have full control of the rams. The grader also includes a scarifying device 79 which is positioned below the carrier 30. The rams can be operated by a fluid, air or steam and preferably are of the hydraulic type.

The ram 77 is secured to the arms 17 and extends rearwardly therefrom and disposed longitudinally with respect to the grader. The ram 77 is also mounted upon the bar 18 in the depending U-portion 19 of the latter. The piston of the ram 77 is indicated at 80 and carries a rod 81 which projects rearwardly from the ram and terminates in a head 82 which is slidably mounted in a pair of guides 82' extending rearwardly from the cylinder of the ram 77. Pivotally connected to one side of the head 82 is the forward end of a shiftable bar 83 which is pivotally connected at its rear end to the upper end of the lever arm 68. Associated with the ram 77, as well as communicating therewith is a controlling valve 84 therefor and extending from said valve 84 is a pair of pressure conducting lines 85, 86 which open into a pump 87. The lines lead from a fluid supply tank, not shown. The latter can be operated from the motor of the tractor or by a separate power unit.

The means for manually setting the depth of the grading blades includes a lever arm 88, which is connected intermediate its ends by a universal joint 89 to a lengthwise extensible, oscillatory link 90' and the latter is coupled by a universal joint 89' to a shaft 90 mounted in the hanger 22. The forward end of lever 88 is pivotally connected to the rear end of a link 99, the latter having its forward end pivotally connected to the lower end of a shifting arm 100 for the stem of the controlling valve 84. The actuator 95 provides for automatically operating the ram during the travel of the machine for controlling the depth of the graders. Fixed to the shaft 90 is a lever arm 101 having its forward end attached to a pull member 102 and its rear end attached to a pull member 103. The members 102 and 103 travel over the pulleys 25, 26 respectively and extend rearwardly therefrom. The lever 88 and its connections with the arm 100 is common to the automatic control relative to depth and the manually operated mechanism for setting the depth of the grader blades. The said manually operated mechanism includes the lever 101 and the pull members 102, 103 and the means for operating such members will now be referred to.

The members 102, 103 are connected to a lever arm 104 forming an element of the mechanism for not only setting the blades relative to depth but also for angularly disposing them. The mechanism is operated manually. The mechanism is indicated at 105 and includes the lever 104 which extends through a base 106, the latter being in the form of an annulus. The member 103 is secured to the lever 104 above base 106 and the member 102 to the lower end of lever 104. The mechanism 105 includes a semi-circular rack 107 which passes through a wide slot 107' in lever 104. The lever 104 carries a spring controlled lever operated latching device which associates with the rack 107 for maintaining the lever 104 in the position set. The latching device must be free to twist in slot 107' and follow twisting of the rack 107. The rack 107 does not pass through slot 107' at the same angle in all positions. Journaled in the bearings 106', formed on the base 106, at diametrically opposed points is a forwardly directed shaft 109. The lever 104 is pivotally mounted on shaft 109 and depends therefrom. Connected to shaft 109 and extending through the lever 104 is a semi-circular rack 110 and associated therewith is a spring controlled latch 111. The rack 110 is fixed to shaft 109 and by this arrangement when lever 104 is moved transversely with respect to the tractor the shaft 109 will be carried therewith. When the member 104 is moved in a rearward direction the member 103 is carried therewith and member 102 released. When lever 104 is moved in a forward direction member 103 is released and member 102 pulled rearwardly. The movement rearwardly of member 102 moves the forward end of lever 101 downwardly and when member 103 is pulled rearwardly the rear end of lever 101 will be moved downwardly. The operation of lever 101 will provide for the operation of lever 88 under such conditions shifting arm 100 to provide for the operation of valve 84. The members 102, 103 pass through a guide 112 which is fixed to shaft 109.

The forward end of the shaft 109 is provided with an upstanding crank arm 113 which is pivotally connected to the lower end of an inwardly extending and upwardly inclined link 114 having its upper end pivotally connected to an elbow shaped lever 115, the latter being mounted in a bearing 118 and terminating in a universal joint connection 116 to which is attached an oscillatory, lengthwise extensible link 117, which is universally connected, as at 119 to and centrally of an upstanding link 120, the latter being pivotally connected at its lower end to an elbow shaped lever 122 mounted in a bearing 123, attached by a universal joint connection 124 with a downwardly extending, forwardly inclined, oscillatory, lengthwise extensible link 125 connected by a universal joint 126 to the actuating arm 126' of a controlling valve 127 for the ram 78. The controlling valve is at the rear side of ram 78 and the latter is disposed transversely with respect to the machine. Extending from the controlling valve 127 are flexible conducting lines 128', 129' which open into the lines 85, 86 respectively.

The grader includes a gyroscopic device for automatically maintaining the angular disposition of the blades during the travel of the machine irrespectively of the position of the tractor. The said device is generally indicated at 128 and includes a pair of rapidly revolving wheels 129, carried on a shaft 130 which extends through the lower portion of a housing 131. The shaft 130 carries a beveled gear 132 which meshes with a beveled gear 133 formed on the lower end of a vertical shaft 134. The latter being provided with a beveled gear 135 which meshes with a beveled gear 136 carried on the end of a shaft 137, the latter being driven from the motor of the tractor or from an independent power unit. The housing 131 includes a tubular portion 138 which is loosely mounted in the bearing 139 carried by a support 139'. The device includes a pair of oppositely extending inclined arms 140 which terminate in a semi-circular member 141 provided with graduations 142. The device includes a setting member 143 which is loosely mounted and provided with a ratchet wheel 144 and coacting with the wheel 144 is a spring controlled latching device 145 for maintaining the setting member 143 in its adjusted position relative to graduations 142.

Pivotally connected to the setting member 143 and adjusted thereby is an angle shaped lever 147 which is pivoted at its lower end to a crank arm 148 extended from a shaft 149, the latter projecting forwardly and rearwardly with respect to the gyroscopic device 128. The shaft 149 is mounted in bearings 149'. The forward end of shaft 149 is formed with an upwardly extending and inwardly inclined crank arm 151 which has its upper end pivotally connected to the outer end of an inwardly extending link 152, and link 152 is pivotally connected to the upper end of link 120. The action of the gyroscopic device 128 automatically maintains the angular disposition of the blades during the travel of the grader. The connections between the gyroscopic device 128 and the link 120 provides for the maintaining of the angular disposition of the blades, during the travel of the grader in their original set position.

Each of the oscillatory and lengthwise extensible links is formed of two sections 153, 154, the latter extending into the former and both of the sections having coacting means to provide for the bodily shifting of them together on their lengthwise axis. The section 153 includes a bifurcated outer end 155. The section 153 has a lengthwise extending slot 156 which opens into a socket 159. The section 154 is formed with a part 157 of circular cross section which extends into the socket 159. The part 157 is formed with a lug 158 which is slidably mounted in slot 156. The section 154 has a bifurcated end 160. The ends 155 and 160 are formed with aligning openings.

The ram 78 is suspended between the bars 64' and 67. Formed integral with the ram 78 is a suspension arm 162 which is pivotally mounted on the pivot connection 60. The piston of the ram 78 is indicated at 163 and the piston rod 164. The rod 164 projects from the cylinder of the ram 78 and is downcurved and pivotally mounted on the pivot connection 66. The bars 64', 67, links 64, 57, 162, piston rod 164 provide a pivot suspension for ram 78.

Extending forwardly from the actuator 95 is a deflector 167 which is pivotally connected with the bar 29. The bar 29 in connection with the rear end edges of the grading blades provides a passage for the forward travel of the loose earth scraped up by the scraping blades. Pivotally connected to the bar 29 and depending therefrom is a spring controlled V-shaped retarder 168. A cab for the operator is indicated at 165.

Rearwardly of the body of the tractor the grader includes a pair of smoothing blades 169, 170 standing on their lower longitudinal edges. The blades 169, 170 are disposed at opposite inclinations and the blade 169 is arranged in advance of blade 170 and is of less length than the length of the latter. The blades 169, 170 are connected to a carrier 171 in the form of an annulus. A channel shaped member 172, corresponding to the member 10 is connected to the rear of the tractor body. The member 172 performs the same function as member 10. Connected to the inturned part 15 of the element 13 and connected to and depending from the curved rear end 5 of the element 2 is a combined guide and retainer 173 corresponding to the element 31. The rear end of the annulus 171 is connected to the combined guide and retainer 173 in the same manner as the annulus 30 to the combined guide and retainer 31. Arranged rearwardly of the tractor is a pair of rams 174, 175 which correspond to the rams 77, 78 respectively and for the same purpose. The operating mechanism for the ram 174 is substantially the same form as the operating mechanism for the ram 77 and this applies to the means for operating the ram 77 to adjust the depth of the smoothing blades. The means for operating the ram 175 for the purpose of maintaining the smoothing blades at their set angle during the travel of the grader is the same as that as shown in connection with ram 78. Hand operated means for angularly adjusting the smoothing blades and which associates with the ram 175 is the same as that as set forth with respect to ram 78. The gyroscopic device 128 and the shaft 149 are common to the rams 78 and 175. The mechanism 177 corresponding to mechanism 105 is employed in connection with the rams 174 and 175. The shaft 180 of the mechanism 177, such shaft corresponding to shaft 109 of mechanism 105, is of greater length than shaft 109. The mechanism at the rear of the machine for association with ram 175 for the purpose of automatically maintaining the smoothing blades at a set angle during the travel of the grader is indicated at 178. The mechanism which associates with the ram 175 for the purpose of angularly adjusting the smoothing blades manually is generally indicated at 179. The manually operated means which associates with the ram 174 for setting the depth of the smoothing blades is indicated generally at 176. The mechanism which associates with the ram 174 for elevating and lowering the smoothing blades is generally indicated at 181. The mechanisms 178, 179, 181 are connected with the carrier 171 in the same manner as referred to in connection with the several mechanisms at the front end of the machine. At the rear of the machine the wheel 43 is omitted, as well as the element 168.

The position of the blades being changed by hydraulic equipment may be prompted to change automatically or they can be changed at will with a double acting lever, that is to say the mechanism 105 or 177.

The angular control both from the front and rear units is prompted to move by the gyroscopic device.

A blade unit is raised or lowered by one hydraulic ram, but the angular control is changed by a different hydraulic ram. Yet both can be operated automatically and with the movement of one having no effect upon the movement of the other. The depth or angle of the blade unit may be changed separately or at the same time by mechanisms 105, 177, without the releasing of the gyroscope. The blade unit at all points rises or lowers at the same rate of speed with relation to its carrier, unless angular control device is being changed at the same time.

The element or wheel 43 is an idle wheel and is placed for the purpose of raising the forward end of the supporting structure in case too steep a grade has been approached, such as a railroad crossing.

The grader is so constructed that if one or both sides of the tractor sinks down or is raised up it will have no effect upon depth or angle of slope on surface being cut, even though one was carrying ten tons of pressure on blade or whatever pressure machine was designed to carry. Therefore a machine in accordance with this invention will produce plane like surfaces under all conditions, such as when travelling through soft places in the roadbed, etc. The angle of slope may be adjusted on blades by the hand lever on the gyroscopic device. Such device is used for the purpose of holding the correct angle at which it is adjusted, regardless of the position into which the tractor gets. As the tractor tilts sidewise the gyroscopic device holds its proper angle with respect to gravity. The gyroscopic device is connected to the control valves for angular control rams. Therefore, the ram changes its position with relation to tractor as tractor changes its position.

The mechanisms operate upon the carriers 30 or 171 and the carrier bodily moves the blades carried thereby. When the carrier is elevated the blades will bodily move therewith and when the carrier is angularly disposed, the blades secured to such carrier are positioned in a like direction.

The scarifying device 79 includes teeth 185 mounted in a heavy cross bar 193 having extending therefrom a pair of arms 183 which are hinged, as at 184 to carrier 30. Hydraulic rams 185, 186 are arranged over bar 193 and have their piston rods 187 connected to the latter. The rams have communicating therewith controlling valves 189 therefor and from which extends pressure conducting lines 190, 191 opening into the lines leading to and from respectively ram 78. Operating lines 192 for the valves 189 extend from the latter to a scarifier control lever, not shown. The scarifier can be set at the desired depth and releasably maintained in such position by rams 189. The scarifier also raises and lowers by ram 77 as blades raise and lower.

As to the operation of the gyroscopic device to provide the function as referred to in connection therewith, an operative example will now be referred to.

Supposing that the grader is on the road with blades adjusted to depth and pitch or slope for road bed. As the grader moves forward the blade in front of the traction means will be held firmly by its supporting means and will cut a planelike surface, after which the traction means will have this same freshly cut plane surface to travel upon. Then if either right or left side of traction means should begin to sink below the plane cut surface, the gyroscope, which in reality is a pendulum, will not swing back and forth but it will hold a line or position that is true to center of gravity because of the wheels 129 rotating at a fast rate of speed.

As carrier tilts to the right or left side the gyroscope will tilt also, but it will just hold true to center of gravity and not go beyond those limits.

Supposing that the cutting edges of the grader blade or blades are adjusted manually to cut a surface that is parallel to the axle shaft 130 of the gyroscope, then at the slightest side movement of the gyroscope with relation to the traction means, power will be transmitted from the gyroscope to angular controlling ram's valve 127 by means of connections 147 and 148 Figure 9. The element 148 is connected to element 149 Figure 2. The element 149 passes through the bearing 149' Figure 9. The element 149 Figure 2 is connected to the arm 151 Figure 9, the element 151 at its upper end being connected to element 152 Figure 9. The other end of element 152 is connected to upper end of link 120 Figure 9. The lower end of link 120 is connected at 121 Figure 9 to element 122.

The element 122 and link 120 work together as though they were just one piece of material, unless element 120 is changed manually. The element 122 passes through bearing 123 Figure 2 and the forward end of element 122 connects to the universal joint 124 Figure 2. The universal joint 124 Figure 13 is connected to the upper end of element 125 Figure 13. The lower end of element 125 Figure 13 forms a part of a sliding link as illustrated in Figures 10, 11 and 12.

The lower end of element 125 connects to the universal joint 126 Figure 13. The forward end of the universal joint 126 is connected to the control arm of valve which regulates supply of pressure to the ram 78 Figure 13.

The parts 21, 64' and 67 Figure 13 will remain parallel to each other at all times during the changing of the position of the blade.

Now if ram 78 (Figure 13) lengthens its stroke then points 60 and 66 which are supporting points for ram 78 will move farther apart. Then the link 52 at the connection 51 will be raised upwardly and the link 59 will be lowered at connection 58 at the same rate of speed. The points 51 and 58 move at the same rate of speed.

The supporting means of right side of blade connects to point 51 and the supporting means for left side of blade connects to point 58.

Therefore if the tilt of the blade is changed, then both sides of blade supporting arms travel at the same rate of speed and at the same time.

Assuming that shaft 130 of the gyroscope Figure 4 is parallel with the cutting edges of blades 27 and 28, then the instant that the traction means tilts to one side, the gyroscope and the shaft 130 will start to move out of parallel relation with the cutting edges of blades 27 and 28. Then the very instant that this change starts to take place, the gyroscope through its connections recently mentioned will open valve 127 very rapidly. The valve 127 regulates the pressure to either shorten or lengthen the stroke of ram 78 as whatever action may be necessary to keep the blade edges parallel with the shaft 130.

The lengthening or shortening of stroke of ram 78 changes the tilt of carrier 30 to which the blades 27 and 28 are firmly fastened. The valve 127 is firmly fastened to carrier 30. The flexible pressure lines are used to connect valve with ram.

The valve 127 is made very sensitive so by a slight movement of the valve control mechanism, the latter will be prompted to act by the connections leading from gyroscope. The valve will open very readily to permit fluid to pass quickly to proper port of ram 78, therefore, changing the stroke of ram 78 quickly. When ram 78 changes its stroke quickly, the tilt of blade will be changed very rapidly because one side of the supporting means of blade is being lowered while the opposite supporting means is being raised.

A large amount of tilt on blade can be obtained on blade with a short stroke of ram, because one side of blade is being lowered while the opposite side is being raised.

As long as the edges of blades 27 and 28 are parallel with the shaft 130 of the gyroscope, the valve 127 is in neutral, and any instant the valve is not in neutral fluid is being forced in to the proper side of piston of ram. The piston moves, then its movement brings valve control back to a neutral position.

What I claim is:—

1. A road grader comprising, a surface working blade unit, and means including a gyroscopic device for automatically maintaining said unit at a set angle during the travel of the grader.

2. A road grader comprising a surface working blade unit, means for adjusting the depth of such unit, and means including a gyroscopic device for automatically maintaining said unit at a set angle during the travel of the grader.

3. A road grader comprising a traction means, a grading unit supported in advance of the forward end of said means, and means including a fluid pressure operated valve controlled ram and a gyroscopic device for automatically maintaining said unit at a set angle during the travel of the grader.

4. A road grader comprising a traction means, an adjustable surface working blade unit supported in advance of one end of said means, said unit being adjustable as to depth and to an angular position with respect to the surface to be acted upon, means including a fluid pressure operated valve controlled ram and a controlling device for the valve of the ram for automatically controlling the depth of said unit during the travel of the machine, and means including a fluid pressure operated valve controlled ram and a controlling device for the valve of the ram for maintaining said unit, during the travel of the grader at the angle set.

5. A road grader comprising, a traction means, a supporting structure extending forwardly and rearwardly from said traction means, a grading blade unit carried by the forward end of said structure in advance of said means, a smoothing blade unit carried by the rear end of said structure rearwardly of said means, said units being adjustable relative to depth and at an angle with respect to said structure, and means common to said units and including valve controlled fluid pressure operated rams and an independent controlling device for the valve of each ram for maintaining them in the angle set during the travel of the grader.

6. A road grader comprising a vertically and angularly adjustable carrier, a pair of spaced grading blades secured to, depending from, disposed at opposite inclinations and extended beyond the sides of the carrier, each of said blades inclining outwardly from rear to front and providing a loose earth passage between said rear ends, a V-shaped blade arranged between said pair of blades and bodily moving with the latter, and automatically operable means connected to the carrier and including a gyroscopic device for maintaining the carrier and blades at a set angle during the travel of the grader.

7. A road grader comprising a vertically and angularly adjustable carrier, a pair of spaced grading blades secured to, depending from, disposed at opposite inclinations and extended beyond the sides of the carrier, each of said blades inclining outwardly from rear to front and providing a loose earth passage between said rear ends, a V-shaped blade arranged between said pair of blades and bodily moving with the latter, automatically operable means connected to the carrier and including a gyroscopic device for maintaining the carrier and blades at a set angle during the travel of the grader, and an adjustable scarifying device arranged forwardly of said V-shaped blade.

8. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surface being graded, and means in connection with the other of the rams for adjusting said unit at an angle with respect to the surface being graded.

9. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surface being graded, and means in connection with the other of the rams for adjusting said unit at an angle with respect to the surface being graded, one of said rams being arranged above and at right angles to the other.

10. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surface being graded, means in connection with the other of the rams for adjusting said unit at an angle with respect to the surface being graded, said unit including a pair of outwardly directed oppositely inclined blades and a V-shaped blade arranged between the inner portions of said pair of blades.

11. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surfaces being graded, and means in connection with the other of the rams for adjusting said unit at an angle with respect to the surface being graded, one of said rams being arranged above and at right angles to the other, said unit including a pair of outwardly directed oppositely inclined blades and a V-shaped blade arranged between the inner portions of said pair of blades.

12. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surface being graded, means in connection with the other of the rams for adjusting said unit at an angle with respect to the surface being graded, an adjustable sacrifier unit pivotally connected to and bodily movable with said grader blade unit, and fluid pressure operated devices for adjusting said scarifier unit.

13. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surface being graded, means in connection with the other of the rams for adjusting said unit at an angle with respect to the surface being graded, one of said rams being arranged above and at right angles to the other, an adjustable scarifier unit pivotally connected to and bodily movable with said grader blade unit, and fluid pressure operated devices for adjusting said scarifier unit.

14. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surface being graded, means in connection with the other of the rams for adjusting said unit at an angle with respect to the surface being graded, said unit including a pair of outwardly directed oppositely inclined blades and a V-shaped blade arranged between the inner portions of said pair of blades, an adjustable scarifier unit pivotally connected to and bodily movable with said grader blade unit, and fluid pressure operated devices for adjusting said scarifier unit.

15. In a road grader, a traction means, a support extended from one end thereof, a pair of fluid pressure operated rams upon the support, an angularly and vertically adjustable grading unit pivotally and slidably connected with the support, means coacting with one of said rams for adjusting said unit relative to depth with respect to the surfaces being graded, means in connection with the other of the rams for adjusting said unit at an angle with respect to the surface being graded, one of said rams being arranged above and at right angles to the other, said unit including a pair of outwardly directed oppositely inclined blades and a V-shaped blade arranged between the inner portions of said pairs of blades, an adjustable scarifier unit pivotally connected to and bodily movable with said grader blade unit, and fluid pressure operated devices for adjusting said scarifier unit.

16. In a road grader, a mobile support, a shaft journaled therein, a carrier, a swinging frame arranged over and pivotally connected with the carrier and pivotally connected with and depending from said shaft, grading means fixed to and depending from the carrier, a fluid pressure operated ram carried by and bodily movable with the frame, means coacting with the ram for angularly adjusting the carrier with respect to the surface being graded, a second fluid pressure operated ram, a connection between the latter and the carrier and including parts pivotally connected together, and means coacting with said second mentioned ram for adjusting the depth of the grading means with respect to the surface being graded.

17. In a road grader, a mobile support, a shaft journaled therein, a carrier, a swinging frame arranged over and pivotally connected with the carrier and pivotally connected with and depending from said shaft, grading means fixed to and depending from the carrier, a fluid pressure operated ram carried by and bodily movable with the frame, means coacting with the ram for angularly adjusting the carrier with respect to the surface being graded, a second fluid pressure operated ram, a connection between the latter and the carrier and including parts pivotally connected together, means coacting with said second mentioned ram for adjusting the depth of the grading means with respect to the surface being graded, an adjustable scarifier unit pivotally connected to and bodily movable with the carrier, and fluid pressure operated means for adjusting said unit.

18. In a road grader, a mobile support, a shaft journaled therein, a carrier, a swinging frame arranged over and pivotally connected with the carrier and pivotally connected with and depending from said shaft, grading means fixed to and depending from the carrier, a fluid pressure operated ram carried by and bodily movable with the frame, means coacting with the ram for angularly adjusting the carrier with respect to the surface being graded, a second fluid pressure operated ram, a connection between the latter and the carrier and including parts pivotally connected together, means coacting with said second mentioned ram for adjusting the depth of the grading means with respect to the surface being graded, and an operating mechanism common to the said means coacting with said rams.

19. In a road grader, a mobile support, a shaft journaled therein, a carrier, a swinging frame arranged over and pivotally connected with the carrier and pivotally connected with and depending from said shaft, grading means fixed to and depending from the carrier, a fluid pressure operated ram carried by and bodily movable with the frame, means coacting with the ram for angularly adjusting the carrier with respect to the surface being graded, a second fluid pressure operated ram, a connection between the latter and the carrier and including parts pivotally connected together, means coacting with said second mentioned ram for adjusting the depth of the grading means with respect to the surface being graded, an adjustable scarifier unit pivotally connected to and bodily movable with the carrier, fluid pressure operated means for adjusting said unit, and an operating mechanism common to the said means coacting with said rams.

20. In a road grader, a traction means, a support extended from one end of the latter, an angularly and vertically adjustable grading unit, a pair of fluid pressure operated rams, one being mounted stationary upon said support, a pivotal suspension structure for the other of said rams and anchored to said support, said structure depending from said support, means coacting with one of said rams for adjusting said unit relative to depth with respect to the surface being graded, and means in connection with the other of said rams for adjusting said unit at an angle with respect to the surface being graded.

21. A road grader comprising a traction means, a surface working unit arranged in spaced relation with respect to one end of said means, a pair of independently operable fluid pressure operated rams arranged above said unit, pivoted connections between one of said rams and said unit and operated from such ram for setting the depth of the unit, pivoted connections between said unit and the other of said rams and operated from the latter for setting the unit at an angle, an independently controllable pressure supply means for each ram, means for locking the unit in set position as to depth, and an operating mechanism shiftable in paths at right angles to each other and common to and for selectively operating the said independent supply means for the rams.

22. A road grader comprising a traction means, a superstructure thereon, a supporting structure extended from one end of the superstructure, a vertically and angularly adjustable surface working unit positioned adjacent one end of said traction means and connected to said supporting structure, a pair of independently operable fluid pressure operated rams arranged above said unit, pivoted connections attached to one of said rams and with said unit for setting the depth of the latter on the operation of such ram, pivoted connections attached to the other of said rams and with said unit for setting the latter at an angle on the operation of such ram, an independently controllable fluid pressure supply means for each ram, and an operating mechanism mounted on said superstructure and shiftable in paths at right angles to each other and common to and for selectively operating the said independent supply means for the rams.

23. A road grader comprising a traction means, a superstructure thereon, a supporting structure extended from one end of the superstructure, a vertically and angularly adjustable surface working unit positioned adjacent one end of said traction means and connected to said supporting structure, a pair of independently operable fluid pressure operated rams arranged above said unit, pivoted connections attached to one of said rams and with said unit for setting the depth of the latter on the operation of such ram, pivoted connections attached to the other of said rams and with said unit for setting the latter at an angle on the operation of such ram, an independently controllable fluid pressure supply means for each ram, an operating mechanism mounted on said superstructure and shiftable in paths at right angles to each other and common to and for selectively operating the said independent supply means for the rams, one of said rams being fixed stationary on said supporting structure, and the other of said rams being pivotally suspended from said supporting structure.

24. A road grader comprising a traction means, a superstructure thereon, a supporting structure extended from one end of the superstructure, a vertically and angularly adjustable surface working unit positioned adjacent one end of said traction means and connected to said supporting structure, a pair of independently operable fluid pressure operated rams arranged above said unit, pivoted connections attached to one of said rams and with said unit for setting the depth of the latter on the operation of such ram, pivoted connections attached to the other of said rams and with said unit for setting the latter at an angle on the operation of such ram, an independently controllable fluid pressure supply means for each ram, an operating mechanism mounted on said superstructure and shiftable in paths at right angles to each other and common to and for selectively operating the said independent supply means for the rams, one of said rams being fixed stationary on said supporting structure, the other of said rams being pivotally suspended from said supporting structure, and said rams being disposed at right angles to each other and one arranged above the other.

25. A road grader comprising a traction means, a superstructure thereon, a supporting structure extended from one end of the superstructure, a vertically and angularly adjustable surface working unit positioned adjacent one end of said traction means and connected to said supporting structure, a pair of independently operable fluid pressure operated rams arranged above said unit, pivoted connections attached to one of said rams and with said unit for setting the depth of the latter on the operation of such ram, pivoted connections attached to the other of said rams and with said unit for setting the latter at an angle on the operation of such ram, an independently controllable fluid pressure supply means for each ram, an operating mechanism mounted on said superstructure and shiftable in paths at right angles to each other and common to and for selectively operating the said independent supply means for the rams, one of said rams being fixed stationary on said supporting structure, the other of said rams being pivotally suspended from said supporting structure, and a fluid pressure controlled scarifying device carried by said unit.

26. A road grader comprising a traction means, a supporting structure extended from one end thereof, a vertical and angularly adjustable carrier positioned at the lower portion and connected with said structure, a pivotal suspension structure attached to said carrier, grading means depending from and bodily moving with the carrier, a fluid pressure operated ram pivotally attached to and supported by said suspension structure and adapted when operated to adjust the carrier at an angle, a fluid pressure operated stationary ram fixed upon said supporting structure, and pivotal connections between said stationary ram and suspension structure for vertically adjusting the carrier when the stationary ram is operated.

27. A road grader comprising a traction means, a supporting structure extended from one end thereof, a vertical and angularly adjustable carrier positioned at the lower portion and connected with said structure, a pivotal suspension structure attached to said carrier, grading means depending from and bodily moving with the carrier, a fluid pressure operated ram pivotally attached to and supported by said suspension structure and adapted when operated to adjust the carrier at an angle, a fluid pressure operated stationary ram fixed upon said supporting structure, pivotal connections between said stationary ram and suspension structure for vertically adjusting the carrier when the stationary ram is operated, and independently controllable fluid pressure supply means for each ram.

28. A road grader comprising a traction means, a supporting structure extended from one end thereof, a vertical and angularly adjustable carrier positioned at the lower portion and connected with said structure, a pivotal suspension structure attached to said carrier, grading means depending from and bodily moving with the carrier, a fluid pressure operated ram pivotally attached to and supported by said suspension structure and adapted when operated to adjust the carrier at an angle, a fluid pressure operated stationary ram fixed upon said supporting structure, pivotal connections between said stationary ram and suspension structure for vertically adjusting the carrier when the stationary ram is operated, independently controllable fluid pressure supply means for each ram, and an operating mechanism shiftable in selective paths at right angles to each other for selectively controlling the supply means for said rams.

29. In a road grader, a traction means, a superstructure extended from one end of said means, a stationary fluid pressure operated ram fixed to the extended portion of said superstructure, a vertically and angularly adjustable grader unit connected with the extended portion of said superstructure below said ram, and angularly adjustable pivotal suspension structure attached to said unit for angularly adjusting it, a fluid pressure operated ram pivotally supported by, bodily moving with and connected to said suspension structure for angularly adjusting it, elevating and lowering means for said suspension structure operated from said stationary ram, and controllable fluid pressure supply means for each of said rams.

30. In a road grader, a vertically and angularly adjustable grading unit, a vertically and angularly adjustable pivotal suspension structure, said unit being bodily carried by said structure, fluid pressure operated means for angularly adjusting said structure to angularly adjust said unit, said means bodily moving with said structure, and fluid pressure operated means connected with said structure for vertically moving it to vertically adjust said unit.

31. In a road grader, a vertically and angularly adjustable grading unit, a vertically and angularly adjustable pivotal suspension structure, said unit being bodily carried by said structure, fluid pressure operated means for angularly adjusting said structure to angularly adjust said unit, said means bodily moving with said structure, fluid pressure operated means connected with said structure for vertically moving it to vertically adjust said unit, and an independent controllable fluid pressure supply means for each of said fluid pressure operated means.

32. In a road grader, a vertically and angularly adjustable grading unit, a vertically and angularly adjustable pivotal suspension structure, said unit being bodily carried by said structure, fluid pressure operated means for angularly adjusting said structure to angularly adjust said unit, said means bodily moving with said structure, fluid pressure operated means connected with said structure for vertically moving it to vertically adjust said unit, and a fluid pressure controlled scarifying device carried by said unit.

JOSEPH H. McCOLM.